US009071565B2

(12) United States Patent
Suryavanshi et al.

(10) Patent No.: US 9,071,565 B2
(45) Date of Patent: Jun. 30, 2015

(54) OPTIMIZING OFFLINE MESSAGE (NETWORK HISTORY) DELIVERY FOR USERS ACCESSING AN APPLICATION FROM A SINGLE DEVICE

(71) Applicant: QUALCOMM Incorporated, San Diego, CA (US)

(72) Inventors: Vijay A. Suryavanshi, San Diego, CA (US); Mohammed Ataur R. Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 13/668,629

(22) Filed: Nov. 5, 2012

(65) Prior Publication Data

US 2014/0129835 A1    May 8, 2014

(51) Int. Cl.
*H04L 9/32*     (2006.01)
*H04L 12/58*    (2006.01)
*H04L 29/06*    (2006.01)
*G06F 21/60*    (2013.01)

(52) U.S. Cl.
CPC ........... *H04L 51/14* (2013.01); *H04L 29/06666* (2013.01); *G06F 21/606* (2013.01)

(58) Field of Classification Search
CPC ..... H04L 51/14; H04L 51/28; H04L 63/0435; H04L 63/08; H04L 63/0428; H04L 9/08; H04L 9/32; H04L 9/3271; H04L 29/04; H04L 29/06666; G06F 21/606; G06F 21/6209
USPC ........................................................ 713/168
See application file for complete search history.

(56) References Cited

U.S. PATENT DOCUMENTS

| | | | |
|---|---|---|---|
| 7,783,044 B2 | 8/2010 | Moreh et al. | |
| 7,912,913 B2* | 3/2011 | Accapadi et al. | 709/207 |
| 2002/0091775 A1* | 7/2002 | Morehead et al. | 709/206 |
| 2003/0018725 A1* | 1/2003 | Turner et al. | 709/206 |
| 2005/0108359 A1 | 5/2005 | Hyder et al. | |
| 2006/0031337 A1 | 2/2006 | Kim | |
| 2006/0167972 A1* | 7/2006 | Zombek et al. | 709/202 |
| 2006/0168037 A1* | 7/2006 | Audu et al. | 709/206 |
| 2006/0204011 A1* | 9/2006 | Adams et al. | 380/282 |

(Continued)

OTHER PUBLICATIONS

International Search Report and Written Opinion—PCT/US2013/067009—ISA/EPO—Jan. 27, 2013.

*Primary Examiner* — Eleni Shiferaw
*Assistant Examiner* — Jing Sims
(74) *Attorney, Agent, or Firm* — Raphael Freiwirth

(57) ABSTRACT

Devices, systems and methods for sending messages from a web service server to a computing device shared by a current user and another offline user while maintaining privacy for the other offline user's messages and decreasing bandwidth requirements for transmission of messages may include registering the user and the offline user of the computing device with the web service server, receiving at the web service server from the computing device a login by a first user, wherein the first user is determined to be the current user, checking a database for undelivered messages for the at least one offline user who is not currently accessing the web service server, wherein any user who is not a current user is determined to be an offline user, encrypting each offline user's undelivered messages, sending the undelivered messages to the computing device, and storing offline user encrypted undelivered messages in the computing device.

53 Claims, 13 Drawing Sheets

(56) References Cited

U.S. PATENT DOCUMENTS

| | | | |
|---|---|---|---|
| 2008/0130630 A1* | 6/2008 | Shim et al. | 370/352 |
| 2008/0172466 A1* | 7/2008 | Tonegawa et al. | 709/206 |
| 2009/0037735 A1* | 2/2009 | O'Farrell et al. | 713/170 |
| 2009/0248799 A1* | 10/2009 | Gavita | 709/204 |
| 2010/0153491 A1* | 6/2010 | Li | 709/203 |
| 2010/0191812 A1* | 7/2010 | O'Donovan | 709/206 |
| 2012/0150975 A1* | 6/2012 | Kallman et al. | 709/206 |
| 2013/0024516 A1* | 1/2013 | Blinder | 709/204 |

* cited by examiner

OPTIMIZING OFFLINE MESSAGE (NETWORK HISTORY) DELIVERY FOR USERS ACCESSING AN APPLICATION FROM A SINGLE DEVICE

BACKGROUND

Computing devices, such as smart phones, tablet computers, and laptop computers, enable a user to connect through a network to a web-service front end to send and receive messages to and from other users. The sent and received messages may include, for example, electronic mail messages (i.e., email), Short Message Service (SMS) messages, multimedia message service (MMS) messages, instant messages, and voice mail messages. Many of these message may be asynchronous messages, meaning that an intended recipient user need not necessarily be currently accessing the web service server (i.e., online) for another user to initiate and send a message to the intended recipient. Messages may be sent to a user at any time, regardless of whether that user is currently accessing the web service server (i.e., whether that user is "online"). In instances when the intended recipient user is offline, messages sent to that user may go undelivered. These undelivered messages may be stored in a database such that the web service server may fetch and deliver these undelivered messages upon detection that the intended recipient comes online. A user may elect to "pull" his undelivered messages. For example, if a user desires to receive his messages, the user may use a device like a smart phone to go online and request his messages from the web service server. Alternatively, the user may elect to have his undelivered message "pushed" to him. For example, when a user comes online, the web service server may detect the user's online status and deliver any undelivered message stored in the database. After a user logs out of the web service server (i.e., goes "offline"), another user may use the same device to log on to the web service server to retrieve any undelivered messages intended for that other user.

SUMMARY

The various embodiments provide a framework whereby network efficiency and overall user experience may be enhanced by sending all currently undelivered messages to all users of a multi-user (shared) device over the same secured connection. The undelivered messages may be stored locally on the shared device until the offline users for which the undelivered message is intended logs in to receive the message. In an embodiment, offline users may be able to access their messages quickly the next time they use the shared device to access the web service server. The various embodiments may also promote user privacy by preventing the current user of the shared device from accessing messages intended for other offline users that may be stored locally on the shared device. In an embodiment, messages sent to offline users and stored on the shared device may be encrypted to ensure that only the intended recipients are able to view their respective messages. In an embodiment, after an offline user logs back into the shared device, the shared device may communicate with a web service server to decrypt that user's (previously offline user's) messages that have been stored locally on the shared device.

In an embodiment, a web service server may determine the physical layer (i.e., network) over which a device may be connected and may limit the amount of data transmitted to the device for offline users based on the type of physical layer. In another embodiment, if an offline user accesses a web service server through multiple devices, the web service server may determine which of the multiple devices the offline user most frequently uses and may only deliver messages to those active devices. In an additional embodiment, a web service server may prioritize the delivery of messages for offline users.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
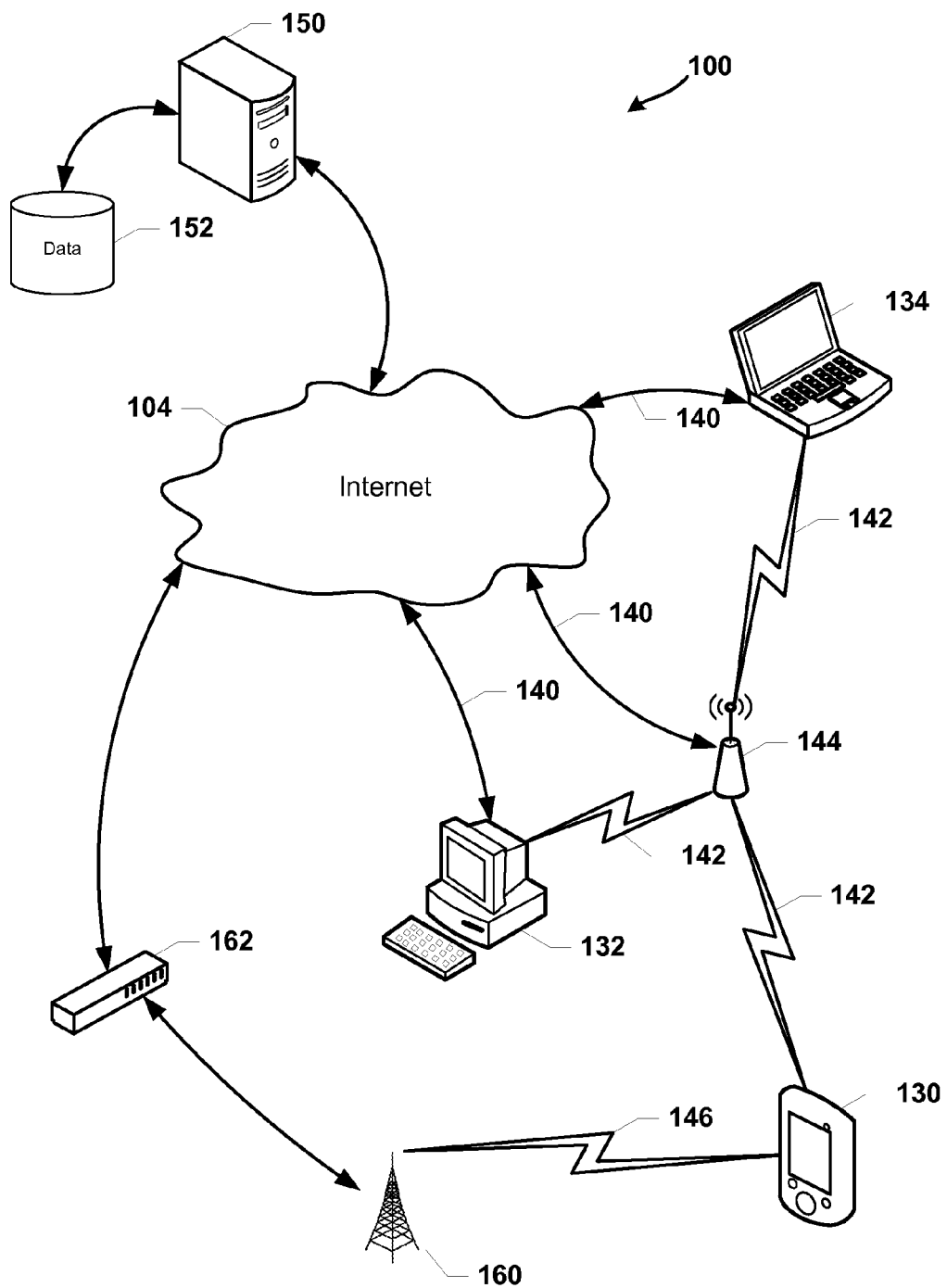
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "device," "mobile device," and "computing device" are used interchangeably herein to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for sending and/or receiving voice and data calls, sending and/or receiving messages (e.g., short message service (SMS) messages, emails, application notifications, such as Facebook® post notifications and/or game high score change notifications, etc.). The term "shared device" herein refers to a device used by a plurality of users.

As used herein, the term "web service server" refers to an application run on a server assessable through a device connected to the Internet that manages and delivers message communications between users.

As used herein, the term "user" refers to a person who has previously registered with a web service server to send and/or receive messages using one or more devices as defined above. The term "offline user" refers to a user of a device that is not currently using a device to access a web service server. Accordingly, the term "current user" refers to a user of a device that is currently using a device to access a web service server.

As used herein, the terms "messages" may refer to communications, such as a voice call (e.g., PSTN call, VOIP call, cellular call, etc.), text based message (e.g., SMS, email), social media message (e.g., Facebook® notification, Tweet®, etc.), whisper message (e.g., a recorded voice message from a YagattaTalk® user), and/or application reminder (e.g., E-bay® auction notification, remote based calendar application reminder, etc.). A device may receive several types of messages.

In overview, the various embodiments may enable a web service server to optimize message delivery for users accessing a web service server through a shared device by sending encrypted undelivered messages for offline users during the current user's web service server session. These various embodiments may also enable a device to download an offline user's messages securely during the current user's session while maintaining that offline user's privacy. Thus, the various embodiments may cause offline users to gain access to their messages faster while maintaining message privacy, which may increases overall user experience.

In various embodiments, during an initial registration session with a web service server using a device, a first user may register his message address (e.g., email address) and the device he is currently using. After the first user registers with the web service server, the web service server may add that user to the set of users associated with the device the user used to conduct his initial registration session (i.e. "registered users"). In an embodiment, the web service server may create a unique user ID for each registered user. In subsequent web sessions, a current user (first user or other user) may access the web service server and request his/her undelivered messages, and the web service server may fetch the current user's undelivered messages from a database. The web service server may lookup which offline users are associated with the current user's shared device, check whether there are undelivered messages for these offline users, and deliver any offline users' undelivered messages to the shared device. The web service server may also encrypt the offline users' messages before delivery to protect the offline users' message privacy. In an embodiment, the web service server may encrypt an offline user's messages with a random key. The offline users' device may store these encrypted messages in local memory.

In an embodiment, the current user's unencrypted messages may be displayed on the device, while in the background (i.e., unknown and inaccessible to the current user), the offline users' encrypted messages may be received and stored on the device for later decryption. In a further embodiment, the offline user's encrypted messages on the device may be decrypted and displayed when the offline user for whom the encrypted message is intended accesses the web service server again by using a decryption key received from the web service server when the offline user accesses the web service server on the device again. In an embodiment, after sending the decryption key for a new current user's messages to the device, the web service server may check to see whether the new current user has any undelivered messages and may deliver those pending messages in unencrypted format. The web service server may transmit any undelivered messages for offline users in encrypted format as described above.

In an embodiment, the web service server may manage offline message delivery based on the physical layer (i.e., network) over which the device is accessing the web service server. For example, the web service server may restrict the volume of offline message data it delivers if the web service server detects that the network connection exhibits a data transfer limitation, such as a monthly cap on data transfers as is typical in many cellular network data plans. Thus, if the current user is accessing the web service server by a WiFi network, all offline user messages may be delivered, but if the device is connected to the server through a cellular telecommunication network (e.g., 3G, 4G, LTE, etc.) offline user messages may not be downloaded and delivered. Alternatively, only a limited number or type of message may be downloaded and delivered. In still further alternative embodiments, only some information regarding the messages may be downloaded and delivered. For example, if the web service server determines that the device is currently connected by a 3G or 4G network which has a limited data plan, the web service server may deliver links or metadata (e.g., a URL or URI) that the device may use to access large messages when the targeted user is online. Such metadata may enable the device to inform the user of the large file pending for download and prompt the user regarding whether she wants to download the messages to the device.

In an embodiment, the web service server may determine which devices associated with an offline user are "active" and send undelivered messages for that offline user only to those active devices. In a further embodiment, the web device may enable users to specify which devices each user selects to be "active" in the initial registration session, or any subsequent web session. For example, the web service server may prompt a user for permission to send offline messages to the device. In another example, users may access the web service server and opt out of receiving offline message on a particular device.

In another embodiment, if more than two offline users are using the same device, the web service server may manage the delivery of undelivered messages by prioritizing offline users' messages to determine an order of delivery. For example, the ranking may be based on the number of times each user has accessed the account from the device, such that those users who have accessed the web service server more frequently will be given a higher priority. In another example, the ranking may be based on the number of offline messages each user receives. In another example, a user may elect to employ a premium service wherein that offline user's messages are given higher priority regardless of frequency of use or number of messages received.

FIG. 1 illustrates a network system 100 suitable for use with the various embodiments. The network system 100 may include a first device 130, a second device 132, and a third device 134. In an embodiment, a first device 130 may be a smart phone, a second device 132 may be a personal computer, and a third device 134 may be a laptop computer. The second device 132 and the third device 134 may be configured to connect to the Internet 104 via wired connections 140. In addition, the first device 130, second device 132, and third device 134 may be configured to connect to the Internet 104 via wireless connections 142 established through a wireless access point 144, such as a Wi-Fi access point. The wireless access point 144 may connect with the Internet 104 through a wired connection 140. Additionally, the first device 130 and a cellular tower or base station 160 may exchange data via a cellular connection 146, which may be CDMA, TDMA, GSM, PCS, 3G, 4G, LTE, or any other type of cellular connection. It should be noted that, while not shown in FIG. 1, the second device 132 and the third device 134 may be equipped with a cellular communication interface and configured to connect to the Internet 104 via a cellular connection 146, which may be CDMA, TDMA, GSM, PCS, 3G, 4G, LTE, or any other type of cellular connection. The cellular tower or base station 160 may be in communication with a router 162 which may connect to the Internet 104. A web service server 150 that manages and delivers messages may also connect to the Internet 104 and have access to a database 152.

Figure 2:
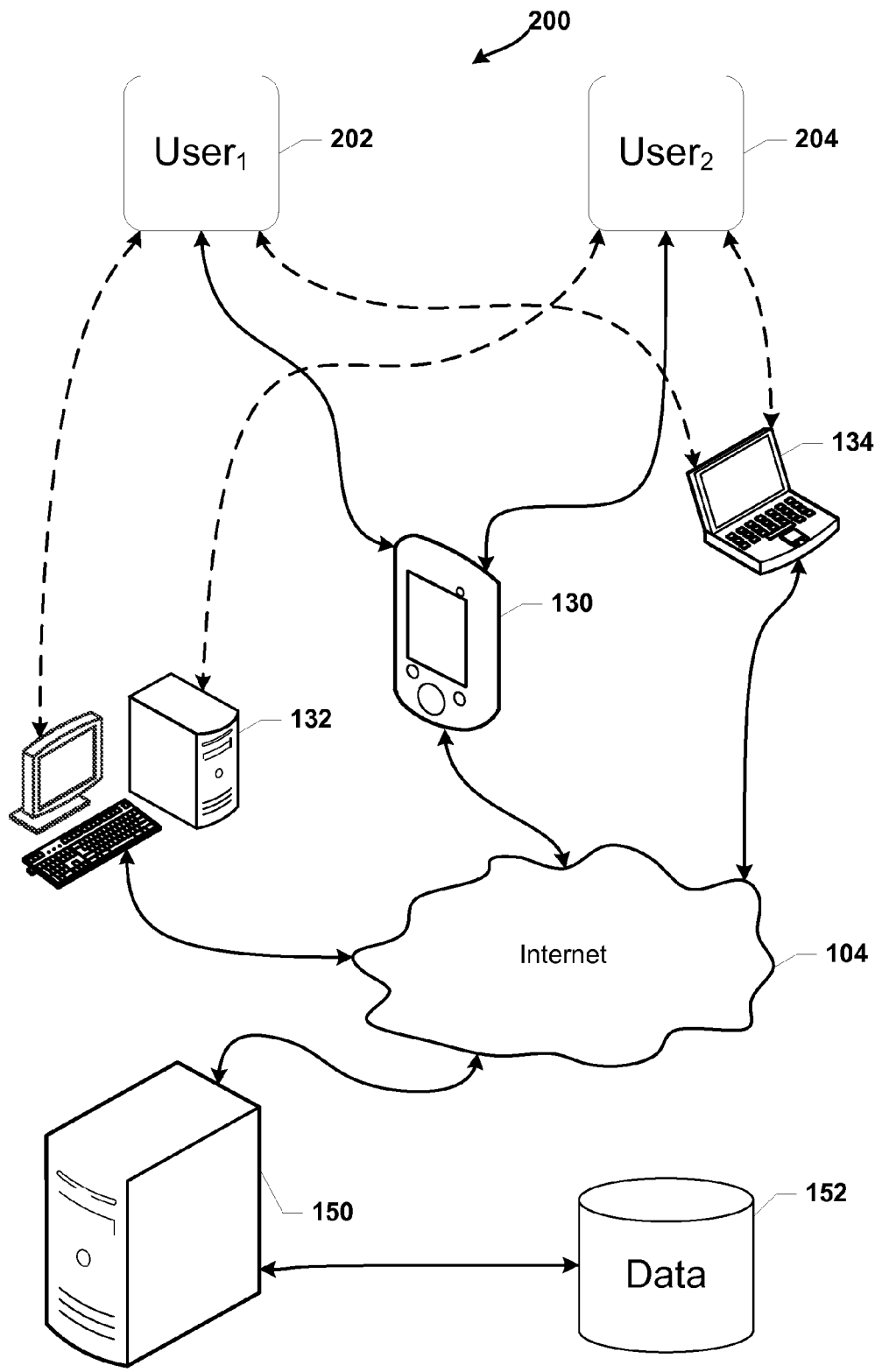
FIG. 2 is a communication system block diagram of a multi-user, multi-device system according to an embodiment.

FIG. 2 illustrates an embodiment of a multi-user, multi-device network system 200. In various embodiments, a system may have one or more devices and a plurality of users who share each of the one or more devices. In an embodiment, a first user 202 and a second user 204 may share at least one of devices 130, 132, and 134, all of which may be able to access a web service server 150 through a connection (wired or wireless) to the Internet 104. In a further embodiment, a first user 202 may use a first device 130 to connect to a web service server 150 and may optionally use at least one of a second device 132 and a third device 134. A second user 204 may share the first device 130 with the first user 202 and may also use the first device 130 to access a web service server 150. In an embodiment, a second user 204 may gain access to a shared first device 130 after a first user 202 logs out of the first device 130. The first user 202 may again use the first device 130 to access a web service server 150 by logging into the web service server 150 after the second user 204 has logged out.

In an embodiment, a web service server 150 may reference a database 152 to determine or update which users are associated with a device that is used to connect to the web service server 150. The web service server 150 may also access the database 152 to fetch any undelivered messages for users associated with a particular device that is accessing the web service server 150. In another embodiment, a web service server 150 may store and/or retrieve shared key information particular to each user in a database 152. The following discussion of various embodiments describes the call flows and operations between an example first device 130 and web service server 150. One of skill in the art would recognize that the same call flow and process flows may be implemented between a second device 132 and/or third device 134 and the web service server 150.

Figure 3:
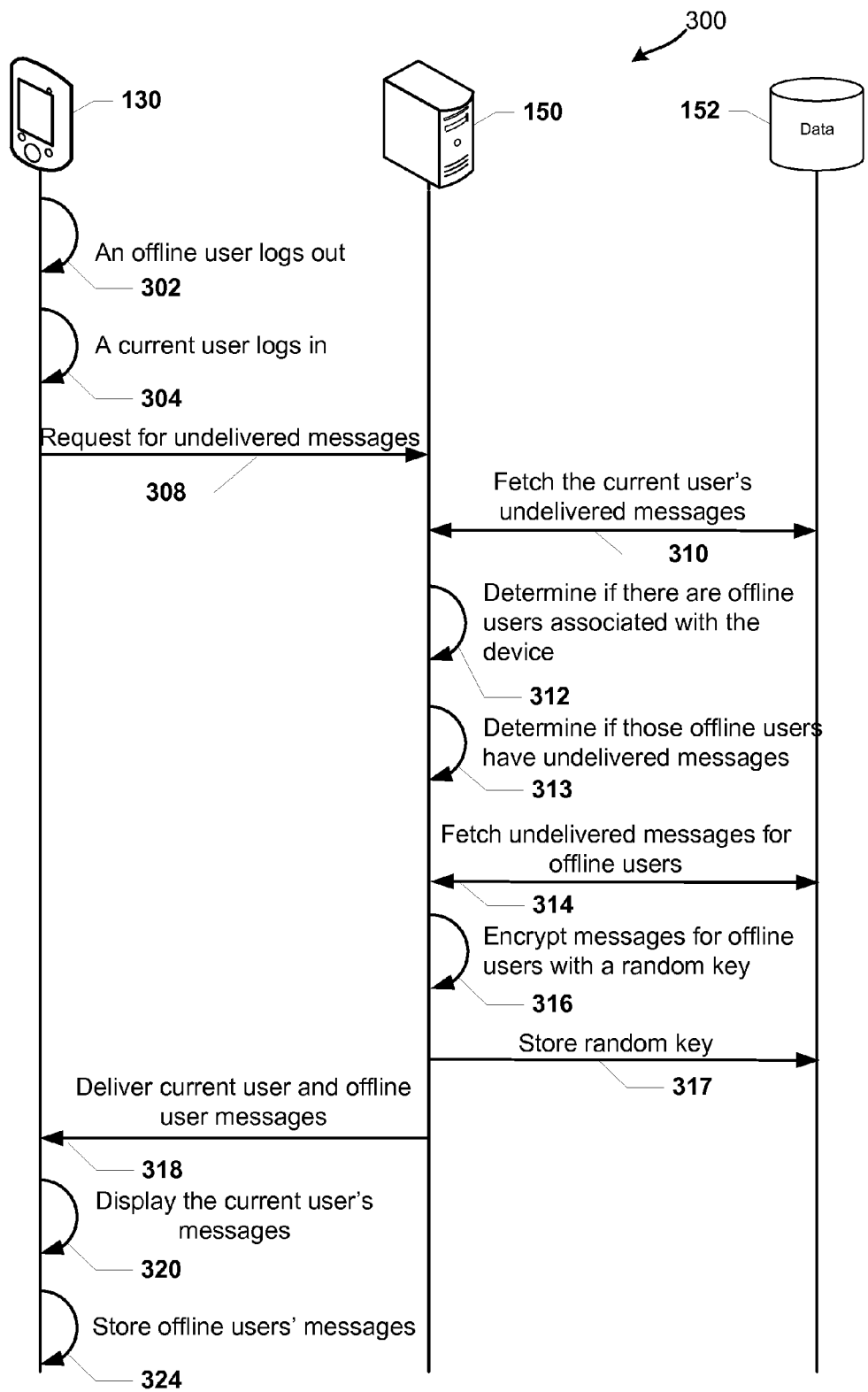
FIG. 3 illustrates an embodiment call flow relationship between a multi-user device and a web service server.

FIG. 3 illustrates an embodiment of a call flow relationship 300 between a shared device 130, a web service server 150, and a database 152. In an embodiment, a device 130 may access a web service server 150 through an Internet connection as discussed above, and the web service server may communicate with a database 152 to store and/or retrieve information. In a further embodiment, the device 130 may be used by a current user and an offline user who may both use the device 130 but not simultaneously. In an embodiment, the current user and the offline user may have previously registered their message addresses and their association with device 130 with the web service server 150. The web service server 150 may have stored their addresses and associations in a database 153 or locally in the web service server 150.

In an embodiment, an offline user, after using a shared device to access a web service server 150, may have logged out of the shared device 130 as shown in operation 302. In operation 304, a current user may log into the device 130 because there is no other user currently using the device 130. After the current user logs into the device 130, the device 130 may send a request signal 308 to a web service server 150 for the delivery of undelivered messages.

In an embodiment, in response to the device 130's request signal 308, the web service server 150 may send a signal 310 to the database 152 to fetch the current user's undelivered messages. The database 152 may transmit the current user's undelivered messages to the web service server 150 in response to the fetch signal 310. The web service server 150 may determine in operation 312 whether any offline users are associated with the device 130. The web service server 150 may also determine in operation 313 whether those offline users associated with the device 130 have undelivered messages waiting to be delivered. In an embodiment, the web service server may use timestamps to determine whether there are messages with a timestamps later than the intended recipient offline user's last log-out event timestamp. The web service server 150 may transmit a signal 314 to the database 152 to cause the database 152 to fetch the offline users' undelivered messages waiting to be delivered. The database 152 may transmit the offline users' undelivered messages waiting to be delivered in response to the web service server 150's signal 314. The web service server 150 may encrypt the offline users' messages in operation 316 with a different random key for each user. The web service server 150 may send a transmission 317 to the database 152 to store the random key. In a further embodiment, the web service server 150 may send a transmission 318 that includes the current user's unencrypted messages as well as the offline users' encrypted messages to the device 130.

In an embodiment, after receiving the current user's unencrypted messages, the device 130 may display the current user's messages on the device 130 in operation 320. In a further embodiment, the device 130 may also locally store the offline users' encrypted messages for later decryption and display in operation 324.

Figure 4:
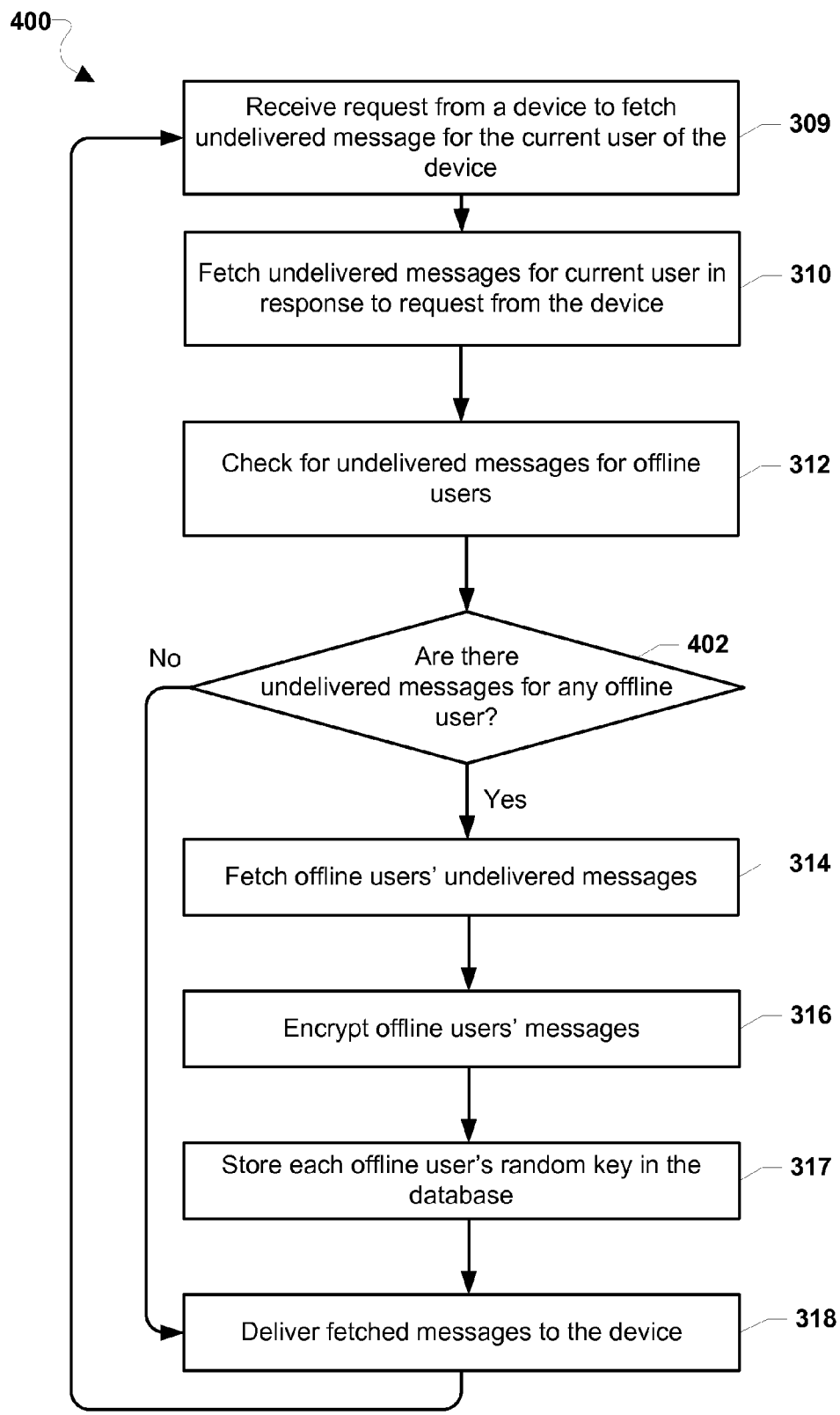
FIG. 4 is a process flow diagram illustrating an embodiment web service server method for delivering messages to a current user and offline users of a device.

FIG. 4 illustrates an embodiment process flow for a web service server message delivery method 400 for delivering messages for the current user and offline users from a web service server. In block 309 of method 400, the web service server 150 may receive a request from a device 130 to fetch undelivered messages for the current user of the device. Upon receiving the request, the web service server 150 may fetch the undelivered messages for the current user in block 310. In an embodiment, the web service server 150 may access a database 152 that contains the undelivered messages for the current user. The web service server 150 may check for undelivered messages for offline users who are also associated with the device 130 in block 312. The web service server 150 may determine whether there are messages waiting to be delivered to any offline user in decision block 402. If there are undelivered messages for at least one offline user (i.e., decision block 402="yes"), the web service server 150 may fetch these undelivered messages in block 314. The web service server 150 may encrypt the undelivered messages in block 316. In an embodiment, the web service server 150 may encrypt the offline users' messages by using a random key. The web service server 150 may encrypt the undelivered messages intended for offline users using a different random encryption key for each offline user that has undelivered messages. The web service server 150 may store each of the random encryption keys associated with an offline user in a database 152 in block 317. The web service server 150 may deliver any messages it has retrieved from the database 152 to the device 130 in block 318, including the current user's messages in unencrypted (or encrypted) form and any undelivered messages for offline users in encrypted form. The web service server 150 may continue operations in block 309.

Figure 5:
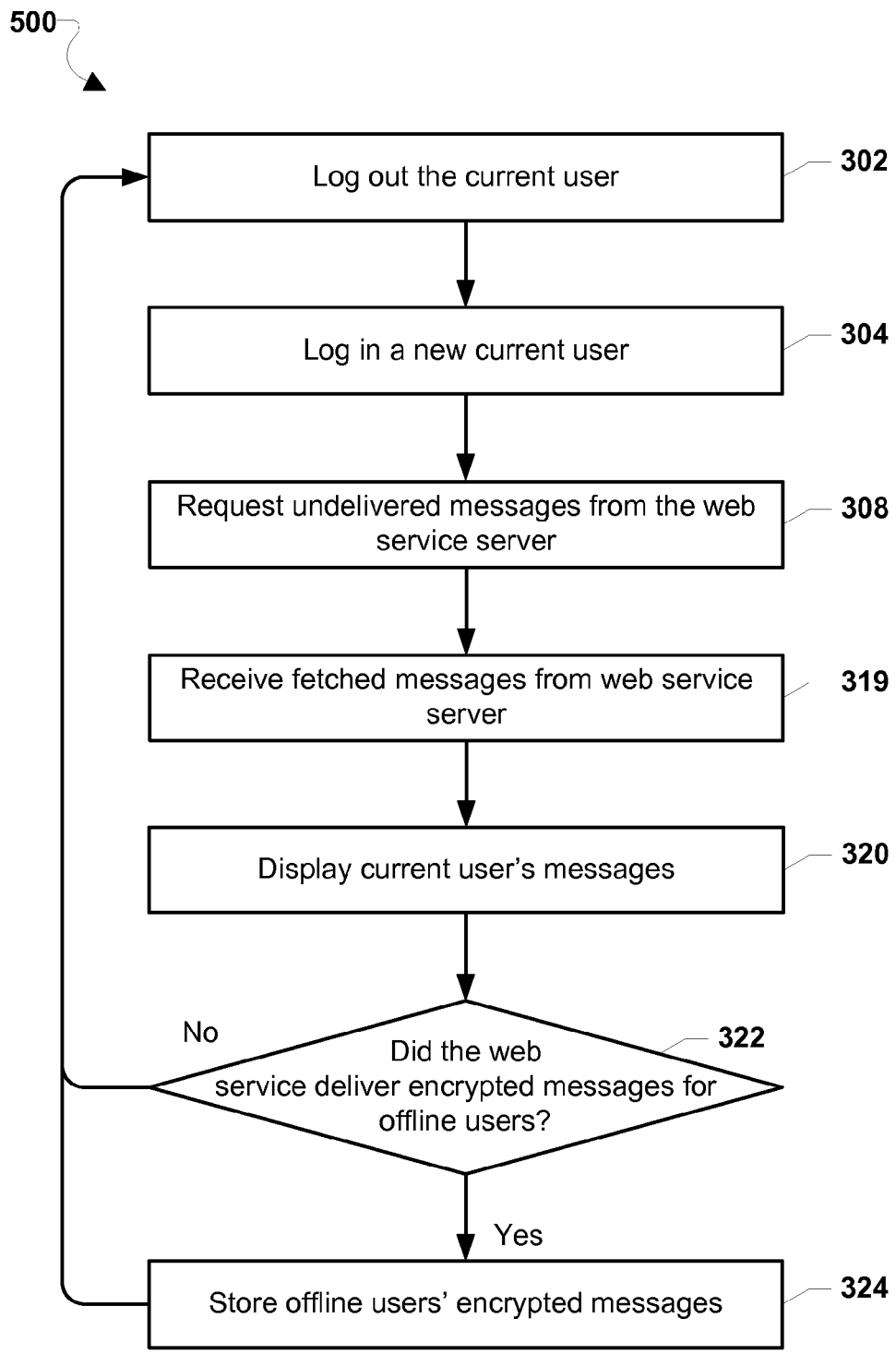
FIG. 5 is a process flow diagram illustrating an embodiment device method for connecting to and receiving messages from the web service server.

FIG. 5 illustrates an embodiment process flow for a device message request and receipt method 500 for connecting to and receiving messages from a web service server. In block 302, the current user of the device 130 may log out. At this point the previously considered current user may become an offline user. A previously considered offline user may log in to the device 130 in block 304. At this point the previously considered offline user may become a current user. In block 308, the device 130 may send a request to the web service server 150 for delivery of undelivered messages. In block 319, the device 130 may receive both the current user's messages and any messages for offline users sent from the web service server 150. The device may display the current user's messages in block 320. The device 130 may determine in decision block 322 whether the web service server delivered any encrypted messages for offline users. If the web service server did deliver encrypted messages for at least one offline user (i.e., decision block 322="no"), the mobile device may continue operations in block 302. Otherwise (i.e., decision block 322="yes"), the device 130 may store those encrypted messages in the device 130's local storage in block 324. In an embodiment, the messages may be stored as a binary large object. In another embodiment, the encrypted messages may be stored in a data table linked to an identifier of each offline user. The mobile device 130 may continue operations in block 302.

Figure 6:
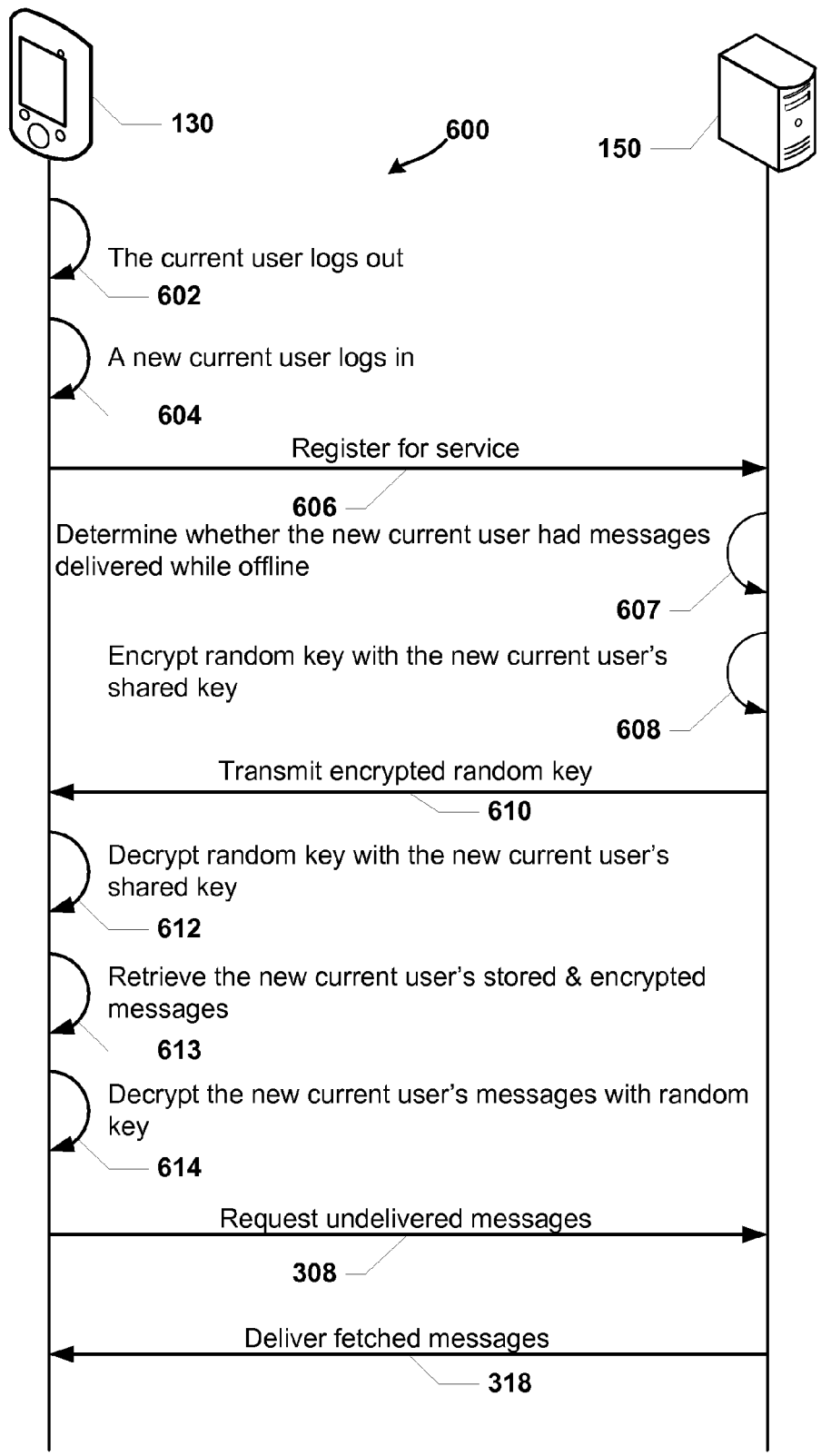
FIG. 6 illustrates an embodiment call flow of the relationship between a device and the web service server with regards to how encrypting and decrypting of offline users' messages is performed.

FIG. 6 illustrates an embodiment signaling and call flow 600 between a device 130 and a web service server 150 when decrypting a user's messages. In an embodiment, a device 130 may access a web service server 150 through an Internet connection 104 as discussed above. In a further embodiment, a device 130 may be used by two users who may use the device 130 at different times, but not simultaneously. In an embodiment, a first user 202 and a second user 204 have previously registered with the web service server 150 using the device 130, and the web service server 150 may have registered a first user 202 and a second user 204 as using the device 130.

In an embodiment, a first user 202 (i.e., the current user) may have been using the device 130 and may subsequently log out as shown in operation 602. In operation 604, a second user 204 (i.e., the new current user) may log into the device 130. The device 130 may transmit a signal 606 to the web service server 150 registering for service. The signal 606 may include the new current user's log in credentials, which the web service server 150 users to authenticate the new current user.

In an embodiment, the web service server 150 may determine in operation 607 whether the new current user has had messages delivered to the device 130 while the new current user was offline. In other words, the web service server 150 may determine whether the device 130 has encrypted messages for the new current user stored in the device 130's memory. In a further embodiment, the web service server 150 may use time stamps as discussed above to determine whether messages were delivered to a device while the new current user was previously offline. The web service server 150 may encrypt a random key with the new current user's shared key (e.g., QSK) in operation 608. The web service server 150 may transmit a signal 610 that includes the encrypted random key to the device 130. The device 130 may use the new current user's shared key to decrypt the encrypted random key in operation 612. The device 130 may retrieve the new current user's messages that are encrypted and stored in operation 613. The new current user's messages may be stored in the device 130's memory. After retrieving the new current user's messages, the device 130 may use the decrypted random key to decrypt the new current user's encrypted messages in operation 614. The device 130 may send a signal 308 requesting delivery of any undelivered messages for the new current user and any offline user in accord with the various methods discussed above. Similarly, the web service server 150 may implement the method discussed in FIG. 4 to transmit a signal 318 delivering any undelivered messages it may fetch.

Figure 7:
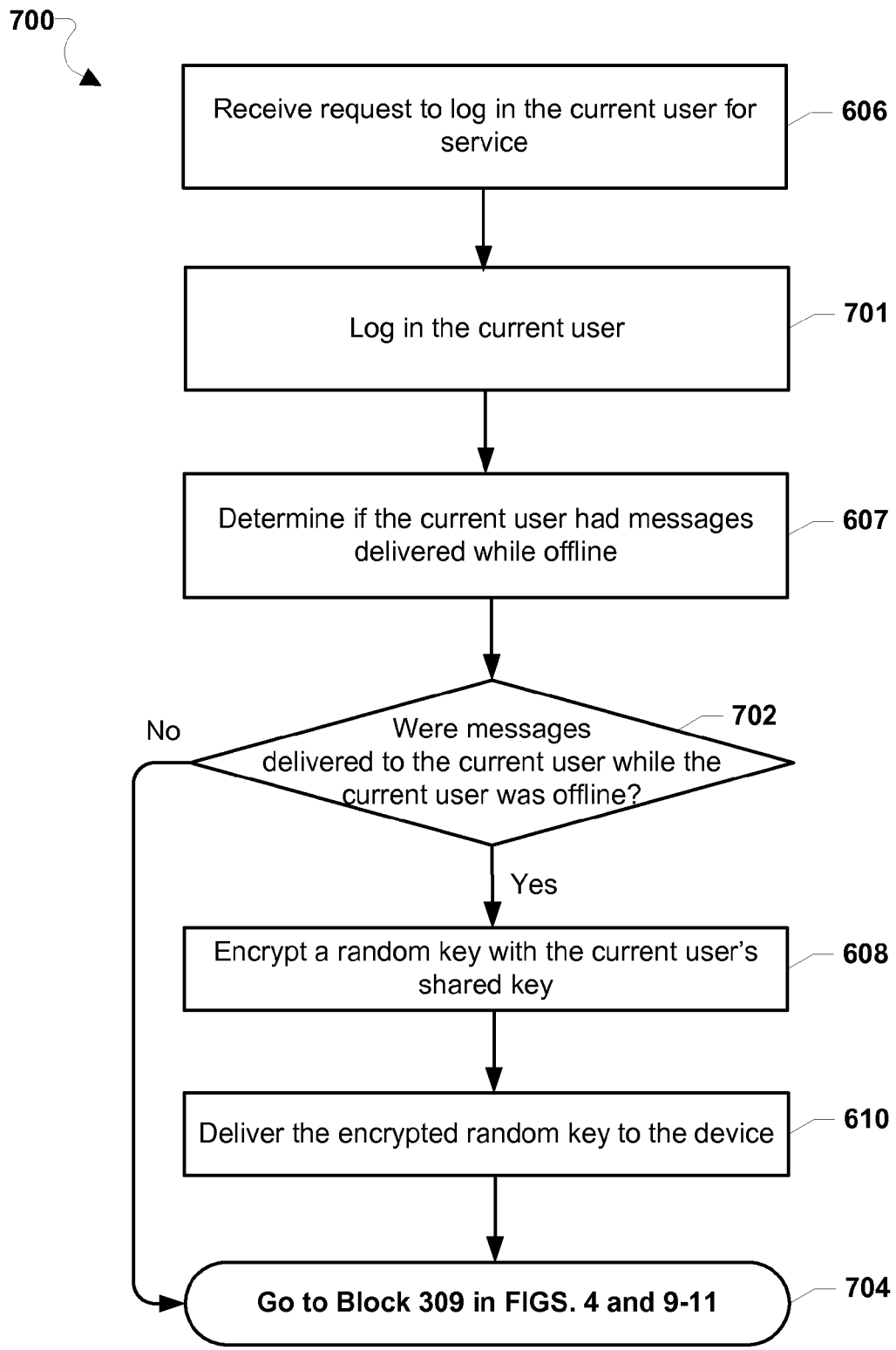
FIG. 7 is a process flow diagram illustrating an embodiment web service server method for delivering offline users' encrypted messages from the web service server to the device.

FIG. 7 illustrates an embodiment web service server method 700 for allowing a device 130 to decrypt encrypted messages stored on the device 130. In an embodiment, a user (i.e., the current user) may request to log in for service with a web service server through a device 130. The web service server 150 may receive the user's request to log in block 606. The current user's request may include the current user's registration information. In block 701, the web service server 150 may register the current user for service. The web service server 150 may determine in block 607 whether the current user had messages delivered to the device 130 while the current user was offline. For example, the web service server 150 may determine whether messages had a timestamp for delivery that was after the timestamp for the current user's last log out event. If, in decision block 702, the web service server 150 did not deliver messages to the device 130 while the current user was offline (i.e., decision block 702="no"), the web service server 150 may continue operations in block 309 in FIGS. 4 and 9-11. In other words, the web service server 150 may fetch any deliver any undelivered messages for the current user and the offline users. Otherwise, if the web service server 150 delivered messages for the current user while the current user was offline (i.e., decision block 702="yes"), the web service server 150 may, in block 608, encrypt a random key with the current user's shared key prior to transmission. The random decryption key may be the decryption key that is required to decrypt the current user's messages stored and encrypted on the device 130. In an embodiment, the web device may encrypt the random key using a shared key (QSK) known to the current user or recognized by the device 130 as being the current user's shared key. In a further embodiment, the web service server 150 may retrieve a shared key associated with the current user from a database 152. The web service server 150 may deliver the encrypted random key to the device 130 in block 610. Remotely storing the means for decrypting the current user's encrypted messages may increase privacy and security by ensuring that only the recipient of messages may access the messages. This privacy and security may be especially beneficial because the device 130 may potentially store a plurality of users' message on the same shared device. Once the encrypted random key is transmitted to the device 130, the web service server 150 may go to block 309 in FIGS. 4 and 9-11.

Figure 8:
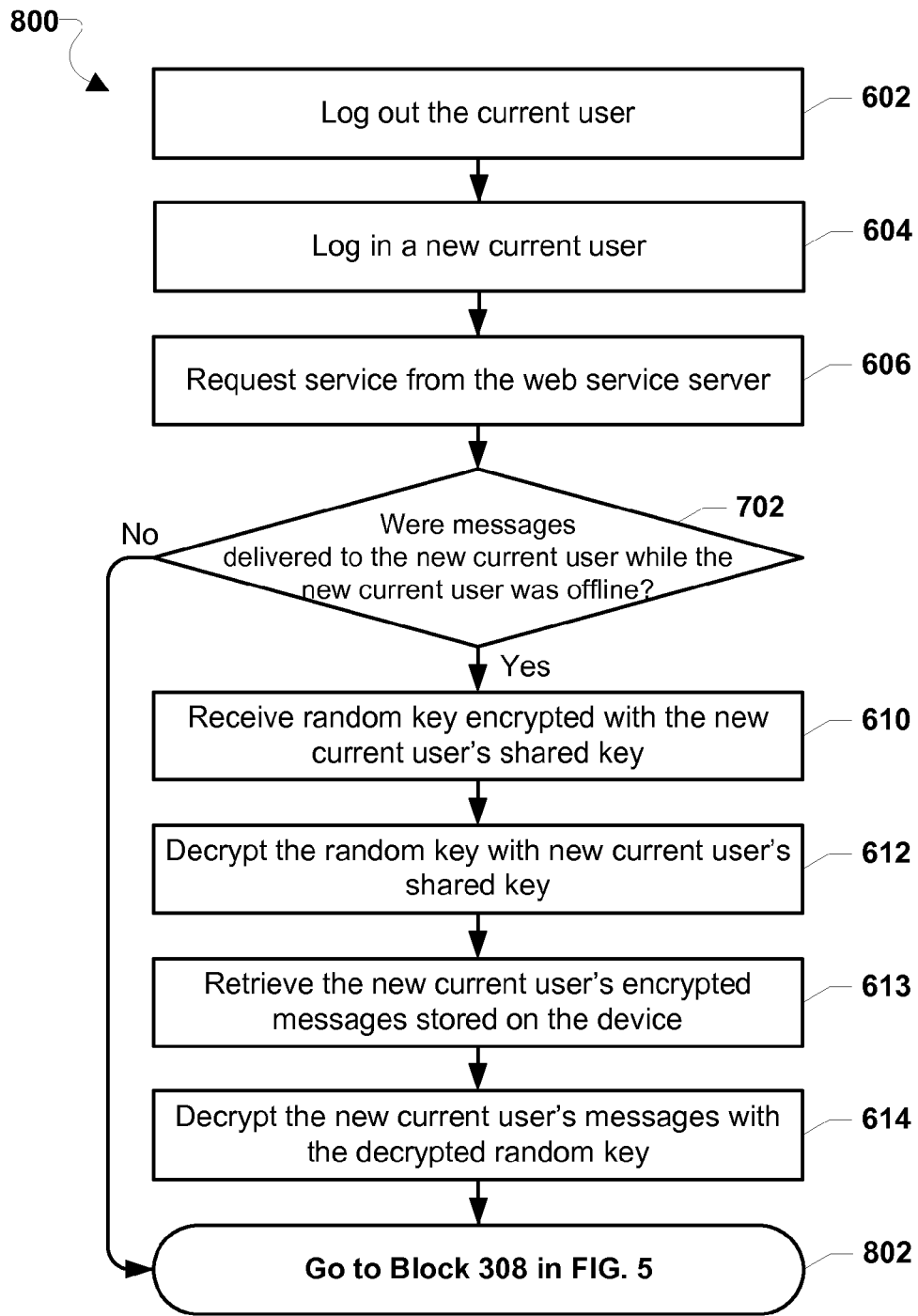
FIG. 8 is a process flow diagram illustrating an embodiment device method for decrypting messages for offline users on the device.

FIG. 8 illustrates an embodiment process flow for a device method for receiving an encrypted random key from a web service server 150 and using that key to decrypt encrypted messages stored for a user on the device 130. A device 130 may log out a current user in block 602. The device 130 may also log in a new current user in block 604. The device 130 may request service from the web service server in block 606. The request may be accompanied by the new current user's log in credentials. In an embodiment, if the device 130 determines that messages were delivered to the new current user (previously an offline user) while the new current user was previously offline (i.e., decision block 702="yes"), the device may receive a random key encrypted with the new current user's shared key in block 610. Otherwise (i.e., decision block 702="no"), the device 130 may continue operations in transition block 802.

Continuing from block 610, the device 130 may use the new current user's shared key to decrypt the random key in block 612. In block 613, the device may retrieve the new current user's stored and encrypted messages. These encrypted messages may have been delivered while the new current user was previously offline. Using the decrypted random key in block 614, the device 130 may decrypt the new current user's stored and encrypted messages that were delivered while the new current user was previously offline. The device 130 may go to block 308 in FIG. 5 from transition block 802.

Figure 9:
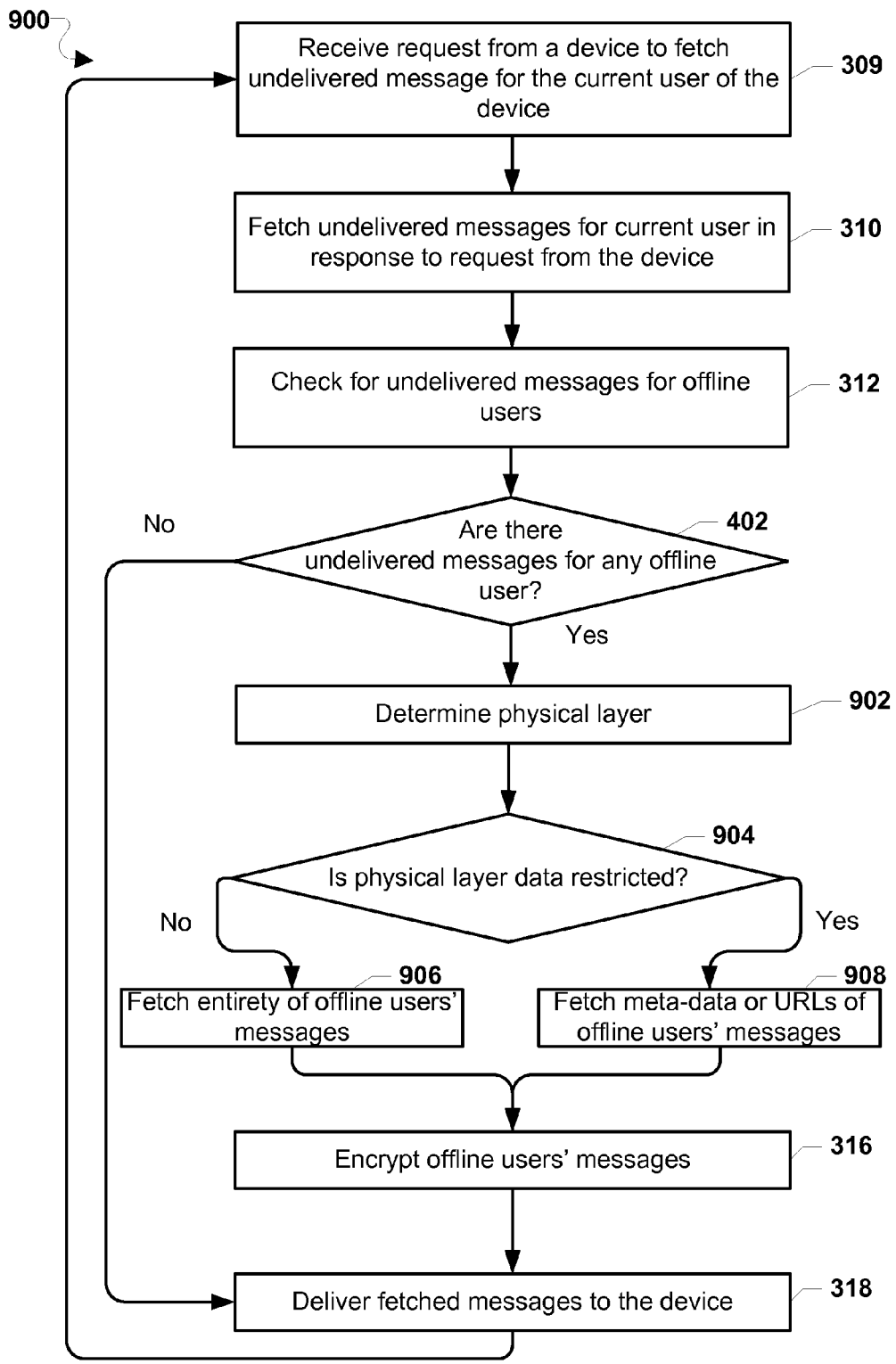
FIG. 9 is a process flow diagram illustrating an embodiment web service server method for delivering offline users' messages after determining a physical layer over which the device is accessing the web service server.

FIG. 9 illustrates an embodiment process flow for a web service server method 900 for delivering offline users' messages to a device after determining the physical layer over which a device 130 is accessing the web service server. In an embodiment, a web service server 150 in block 309 may receive a request from a device 130 to fetch undelivered messages for the current user of the device 130. The web service server 150 may respond to the request for delivery of messages by a device 130 in block 310. After fetching the current user's undelivered messages, the web service server 150 may check for undelivered messages to offline users in block 312. The web service server 150 may determine whether there are any undelivered messages for at least one offline users associated with the requesting device 130 in decision block 402. In the case that there are undelivered messages for at least one offline user (i.e., decision block 402="yes"), the web service server 150 may determine what type of physical layer (i.e., network) the device 130 is using to access the web service server 150 in block 902. The physical layer may be, for example, a Wi-Fi connection, a wired internet connection, or a connection through a cellular network, such as the 3G/4G cellular network. After determining the physical layer over which the device is accessing the web service server 150, the web service server 150 may determine whether the physical layer is a type of network that characteristically has a restriction on the amount of data that a user may transfer in decision block 904. For example, if a user is connecting to the web service server over a 3G network using a smart phone, the web service server 150 may recognize the 3G network as a data-restrictive physical layer. In another example, if a user uses a laptop to connect to the web service server over a Wi-Fi network, the web service server 150 will be able to determine that the device does not have a data restriction. Thus, in an embodiment, if the web service server 150 determines that the physical layer is not data restricted (i.e., decision block 904="no"), the web service server 150 may fetch the entirety of the offline users' messages in block 906. On the other hand, if the web service server 150 determines that the physical layer is data restricted (i.e., decision block 904="yes"), the web service server 150 may choose to fetch only a limited portion of the undelivered messages as demonstrated in block 908. In an embodiment, the web service server 150 may deliver only metadata or links to a user's messages. In this fashion, the web service server 150 may limit the amount of offline message data that is transmitted over the physical layer to avoid data overages or excessive data use. Such limitations may be based on total cumulative size of messages, individual size of messages, number of messages, frequency of message retrievals, etc. Upon fetching either the entirety of the offline users' messages (block 906) or only a limited representation of those messages (block 908), the web service server 150 may encrypt the messages in block 316. After encryption, the web service server 150 may deliver the messages to the device in block 318.

In the case that there are no undelivered messages for at least one offline user (i.e., decision block 402=No), the web service server 150 may deliver the fetched messages for the current user of the device, operation 318. Following the delivery of the fetched messages for the current user of the device and/or any offline users associated with the device, the web service server 150 may await the next receipt of a request from a device to fetch undelivered messages in block 309.

Figure 10:
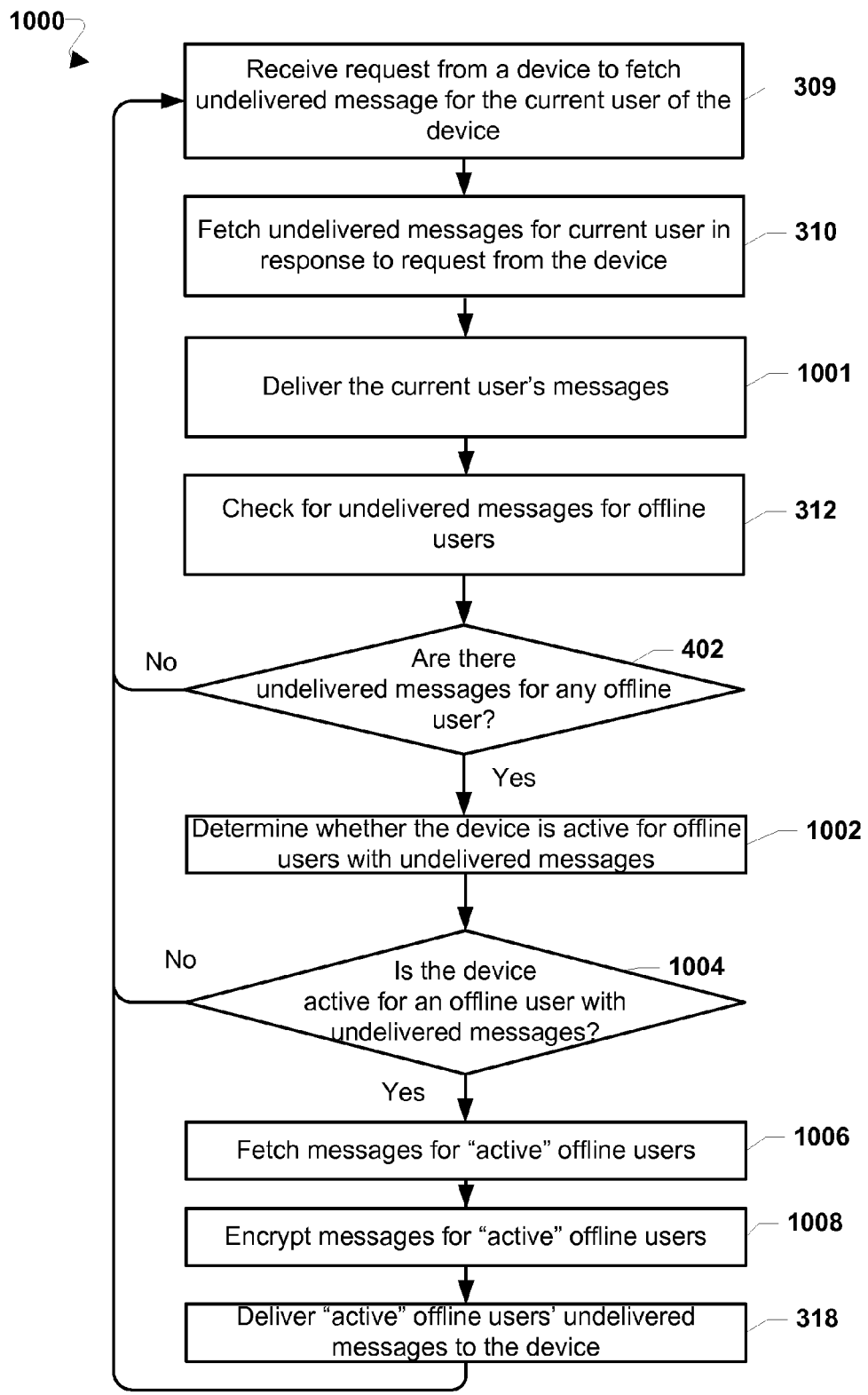
FIG. 10 is a process flow diagram illustrating an embodiment web service server method for delivering offline users' messages to active devices.

FIG. 10 illustrates an embodiment process flow for a web service server method 1000 that may deliver messages only to devices that an offline user may register as an "active" device to ensure that the web service server 150 does not continually deliver messages for that offline user to the devices that are not used (i.e., "dormant" devices). In an embodiment, a user may routinely use multiple devices to access a web service server 150. For example, a user may use any combination of a laptop computer 134, a personal computer 132, and a smart phone 130 to check his messages on the web service server 150. In another embodiment, a user may use multiple devices, but some of the devices are only used once or are used very infrequently. For example, a user may use a public computer to check his messages only once. Without some awareness of how often a user is using a device, a web service server 150 may continually deliver messages for an offline user to a device even though the user will only use that device once.

In an embodiment shown in FIG. 10, a web service server 150 may receive a request from a device 130 to fetch undelivered messages for the current user of the device 130 in block 309. In response to the device 130's request, the web service server 150 may fetch the current user's undelivered messages in block 310. The web service server 150 may deliver the current user's messages in block 1001. The web service server 150 may check for undelivered messages to offline users in block 312. The web service server 150 may determine whether there are any undelivered messages for at least one offline user associated with the requesting device 130 in decision block 402. In the case that there are undelivered messages for at least one offline user (i.e., decision block 402="yes"), the web service server 150 may determine in block 1002 whether the device is active for offline users with undelivered messages. If there are no undelivered messages for offline users (i.e., decision block 402="no"), the web service server 150 may continue operations in block 309.

In an embodiment, the web service server 150 may make a determination in block 1002 by checking if the time period between the current time and the last time the offline user used the device 130 to access the web device 130 is shorter a given threshold. For example, if the offline user has not used a device to check his messages in over a week, the web service server 150 may consider the device to be dormant as to that offline user. In other words, the web service server 150 may determine whether a user is actively using a device based on the frequency of the user's logins. In another embodiment, the web service server 150 may prompt the user to specify whether the user would like offline messages sent to a device 130 at the point when the user uses the device 130 for the first time to register for service with the web service server 150. For example, if a user is using a device for the first time (e.g., using a public computer), the web service server 150 may ask a user for authorization to send offline messages to that device, and the user may opt out of receiving messages on that device because the user believes she will not use the device again. In another embodiment, a user may log on to the web service server 150 and manually specify to which devices the web service server may send messages (i.e., what devices are active).

If the device 130 is not active for an offline user with undelivered messages (i.e. decision block 1004="no"), the device 130 may continue operations in block 309. Otherwise (i.e., decision block 1004="yes"), the web service server 150 may fetch the "active" offline users' messages in block 1006. The web service server 150 may encrypt those offline users' messages in block 1008. The offline users' message may be encrypted to preserve their privacy and to ensure that only the offline user associate with a particular encrypted message may assess that message. After encrypting the active offline users' messages, the web service server 150 may deliver the "active" offline users' undelivered messages to the device 130. The web service server 150 may continue operations in block 309. While the actions above have been described in a certain order, one of ordinary skill in the art would appreciate that the actions may be performed in various orders.

Figure 11:
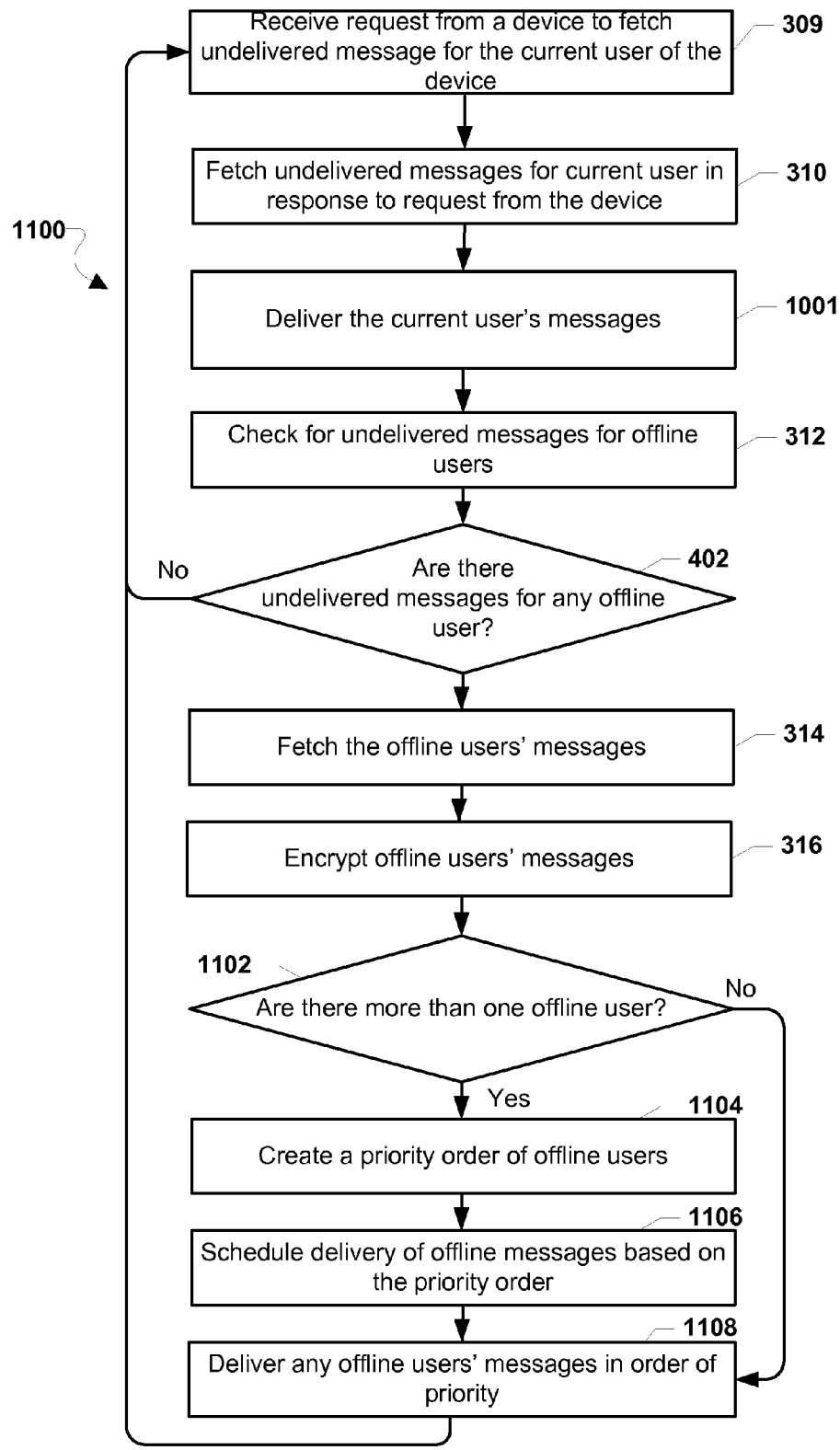
FIG. 11 is a process flow diagram illustrating an embodiment web service server method for delivering messages to offline users according to a priority order of the offline users.

FIG. 11 illustrates an embodiment process flow for a web service server method 1100 for delivering messages to offline users according to a priority order. In the embodiment shown in FIG. 11, a web service server 150 may receive a request from a device 130 to fetch undelivered messages for the current user of the device 130 in block 309. The web service server 150 may respond to the request for delivery of messages by a device 130 in block 310. After fetching the current user's undelivered messages, the web service server 150 may deliver the current user's messages in block 1001. The web service server 130 may check for undelivered messages to offline users in block 312. The web service server 150 may determine whether there are any undelivered messages for at least one offline users associated with the requesting device 130 in block 402. In the case that there are no undelivered messages for at least one offline user (i.e., decision block 402="no"), the web service server 150 may continue operations in block 309. Otherwise (i.e., decision block 402="yes"), the web service server 150 may fetch the offline users' undelivered messages in block 314. The web service server may encrypt the undelivered messages in block 316 to protect the offline users' privacy and to unauthorized access to the messages.

In decision 1102, the web service server 150 may determine whether there is a plurality of offline users. In an embodiment, if there is a plurality of offline users as determined in decision block 1102 (i.e., decision block 1102="yes"), the web service server 150 may implement a priority or ranking system of offline users. The priority order may govern which offline users receive their undelivered messages before others. This priority system may also optimize message delivery when there are limited resources (e.g., time or bandwidth) by assigning a higher priority to users that may benefit from having their undelivered messages already downloaded to the device. In block 1104, the web service server 150 may create a priority ranking of the plurality of offline users. In an embodiment, a priority order may be based on how frequently a user uses the web service server. In another embodiment, a priority may be based on the average number of messages a user receives, such that a user with a higher average number of messages may have a higher priority than another user who receives fewer messages. In a further embodiment, the web service server may use heuristics to determine the appropriate ranking. In still a further embodiment, one or more particular user(s) may employ a premium service to insure that their respective messages are treated with higher priority than other non-premium users. After ranking the offline users with undelivered messages in block 1104, the web service server 150 in block 1106 may schedule delivery for offline users' undelivered messages in accordance with each offline user's respective priority. For example, the delivery schedule may have the web service server 150 deliver the highest priority offline user's messages first, the next highest priority offline user's messages second, and so on. In an embodiment, upon scheduling the delivery priority for the messages to the device 130, the web service server 150 may deliver the current user's undelivered messages first and delivery the offline users' undelivered messages in priority order in block 1108. Following the delivery of the fetched messages for the current user of the device and/or any offline users associated with the device, the web service server 150 may await the next receipt of a request from a device to fetch undelivered messages in block 309.

Figure 12:
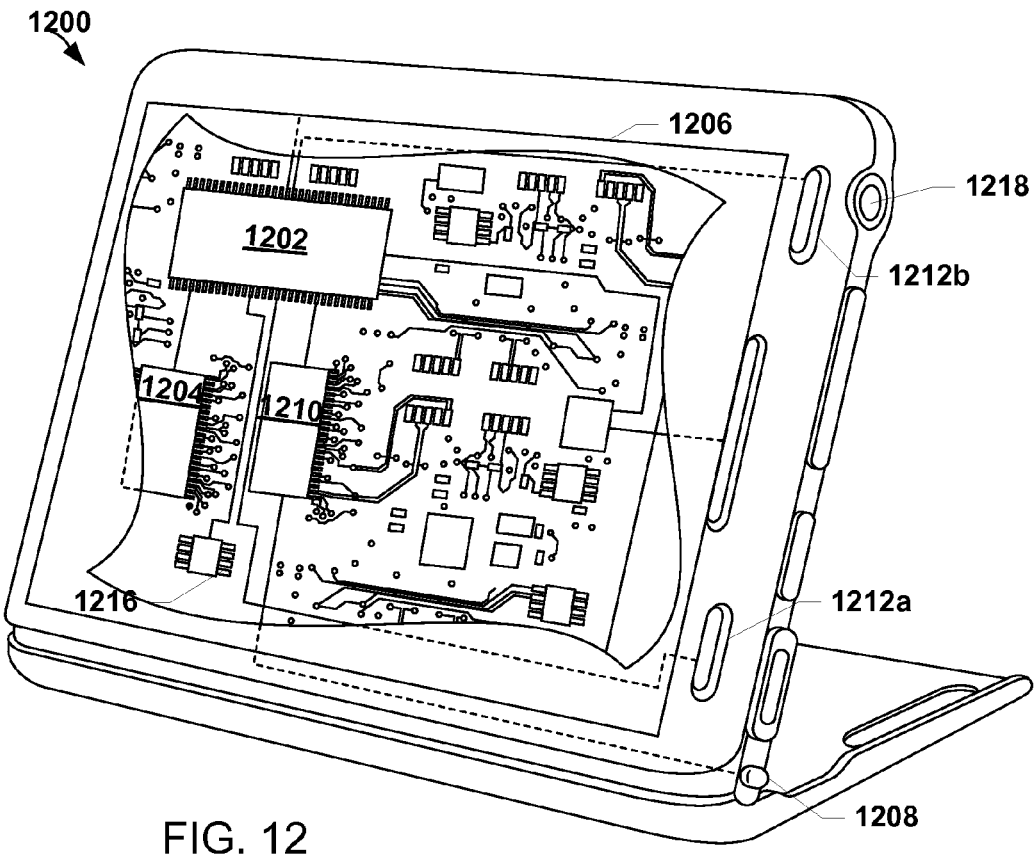
FIG. 12 is a component diagram of an example device suitable for use with the various embodiments.
Figure 13:
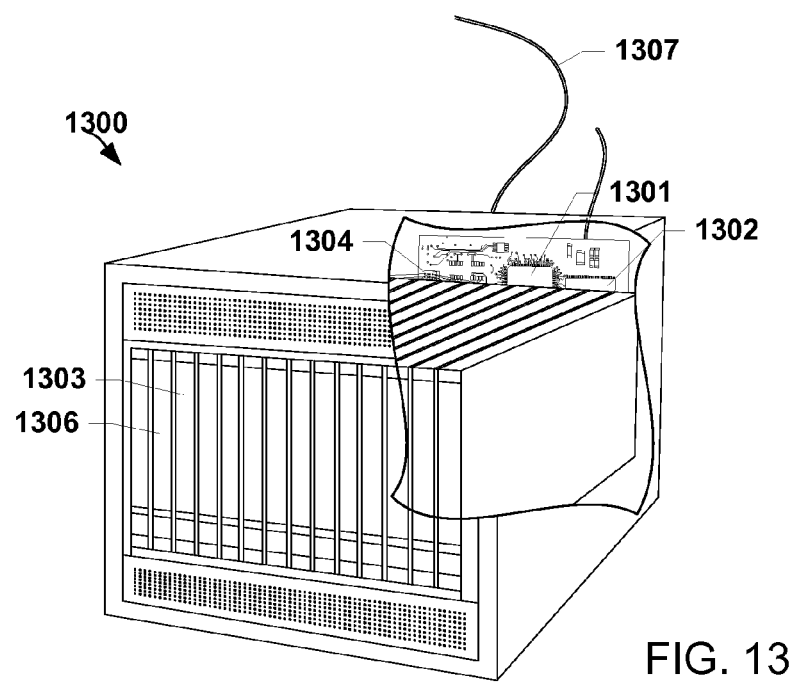
FIG. 13 is a component diagram of an example server suitable for use with the various embodiments.

The various embodiments may be implemented in any of a variety of mobile devices, an example of which is illustrated in FIG. 12. For example, the mobile device 1200 may include a processor 1202 coupled to internal memories 1204 and 1210. Internal memories 1204 and 1210 may be volatile or non-volatile memories, and may also be secure and/or encrypted memories, or unsecure and/or unencrypted memories, or any combination thereof. The processor 1202 may also be coupled to a touch screen display 1206, such as a resistive-sensing touch screen, capacitive-sensing touch screen infrared sensing touch screen, or the like. Additionally, the display of the mobile device 1200 need not have touch screen capability. Additionally, the mobile device 1200 may have one or more antenna 1208 for sending and receiving electromagnetic radiation that may be connected to a wireless data link and/or cellular telephone transceiver 1216 coupled to the processor 1202. The mobile device 1200 may also include physical buttons 1212*a* and 1212*b* for receiving user inputs. The mobile device 1200 may also include a power button 1218 for turning the mobile device 1200 on and off The various embodiments may be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1306 coupled to the processor 1301. The server 1300 may also include network access ports 1304 coupled to the processor 1301 for establishing data connections with a network 1307, such as a local area network coupled to other broadcast system computers and servers or to the Internet.

Figure 14:
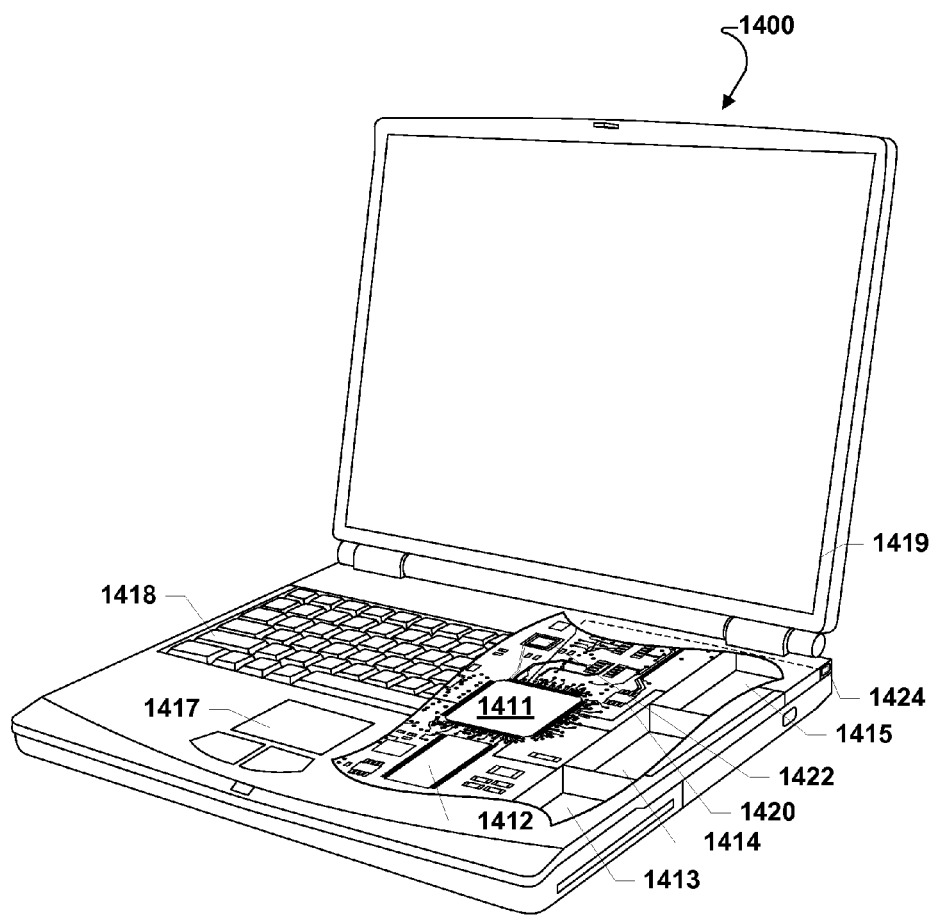
FIG. 14 is a component diagram of another example mobile device suitable for use with the various embodiments.

The various embodiments described above may also be implemented within a variety of mobile devices, such as a laptop computer 1400 illustrated in FIG. 14. Many laptop computers include a touch pad touch surface 1417 that serves as the computer's pointing device, and thus may receive drag, scroll, and flick gestures similar to those implemented on mobile computing devices equipped with a touch screen display and described above. A laptop computer 1400 may include a processor 1411 coupled to volatile memory 1412 and a large capacity nonvolatile memory, such as a disk drive 1413 of Flash memory. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be use in conjunction with the various embodiments. Additionally, the laptop computer 1400 may have one or more antenna 1422 for sending and receiving electromagnetic radiation that may be connected to a wireless data link and/or cellular telephone transceiver 1420 coupled to the processor 1411. The laptop computer 1400 may also include a wired network access port 1424 coupled to the processor 1411 for establishing data connections with a network, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of sending messages from a web service server to a computing device shared by a current user and an offline user while maintaining privacy for the offline user's messages and decreasing bandwidth requirements for transmission of messages, comprising:

registering the current user and the offline user with the web service server;

receiving at the web service server from the computing device a first user login including a first user ID and identifying a first user as the current user of the computing device;

querying a database to identify undelivered messages of the current user and to identify undelivered messages of the offline user in response to identifying the first user as the current user of the computing device;

sending the identified undelivered messages of the current user to the computing device; and encrypting the identified undelivered messages of the offline user and sending the encrypted undelivered messages of the offline user to the computing device.

2. The method of claim 1, further comprising:

receiving the undelivered messages of the current user and the undelivered messages of the offline user in the computing device;

displaying the received messages of the current user on an electronic display of the computing device via a foreground process; and storing the received messages of the offline user in a memory of the computing device via a background process.

3. The method of claim 1, wherein encrypting the identified undelivered messages of the offline user comprises:
  encrypting the identified undelivered messages of the offline user using a random encryption key that is unique to the offline user; and
  storing a decryption key suitable for decrypting the identified undelivered messages of the offline user in a data table linked to an identifier of the offline user.

4. The method of claim 3, further comprising:
  encrypting the identified undelivered messages of the current user prior to transmission; and
  transmitting a decryption key suitable for decrypting the identified undelivered messages of the current user to the computing device.

5. The method of claim 3, further comprising:
  receiving at the web service server from the computing device a second login including a second user ID by a second user and identifying the second user as a new current user of the computing device;
  determining whether the new current user had encrypted undelivered messages delivered to the computing device while the new current user was offline;
  recalling the stored decryption key linked to the new current user;
  encrypting the recalled decryption key using a shared key known to the new current user and the computing device;
  transmitting the encrypted recalled decryption key to the computing device;
  decrypting the encrypted recalled decryption key on the computing device using the shared key known to one of the new current user and the computing device;
  decrypting the new current user's encrypted messages on the computing device using the decrypted recalled decryption key; and
  displaying the decrypted messages to the new current user on the computing device.

6. The method of claim 1, further comprising:
  determining a physical layer over which the computing device is accessing the web service server; and
  restricting an amount of data sent to the computing device for the offline user based on the determined type of physical layer.

7. The method of claim 1, wherein sending the encrypted undelivered messages of the offline user to the computing device comprises sending encrypted undelivered messages for multiple offline users to the computing device, the method further comprising:
  creating a delivery priority for undelivered messages for the multiple offline users; and
  sending each offline user's encrypted undelivered messages to the computing device based on the delivery priority.

8. The method of claim 7, wherein creating the delivery priority for undelivered messages for the multiple offline users comprises:
  determining a frequency of use by each user of the computing device to access the web service server; and
  prioritizing delivery of undelivered messages for offline users based on the determined frequency of use of the computing device such that undelivered messages for more frequent users are sent before undelivered messages for less frequent users.

9. The method of claim 1, further comprising:
  recognizing at the web service server when a particular user is no longer actively using the computing device to access the web service server; and
  not transmitting undelivered messages to the computing device for the particular user recognized as no longer actively using the computing device to access the web service server.

10. The method of claim 9, wherein recognizing when the particular user is no longer actively using the computing device to access the web service server comprises:
  determining a frequency of user logins by the particular user received from the computing device; and
  recognizing when the particular user is no longer actively using the computing device to access the web service server based on the determined frequency of user logins by the particular user received from the computing device.

11. A method for receiving messages from a web service server on a computing device shared by a current user and an offline user while maintaining privacy for the offline user's messages and decreasing bandwidth requirements for transmission of messages, comprising:
  registering the current user and the offline user with the web service server;
  sending a first login including a first user ID by the current user to the web service server;
  receiving undelivered messages of the current user and encrypted undelivered messages of the offline user from the web service server in response to sending the first login including the first user ID to the web service server;
  storing received encrypted messages of the offline user in a memory of the computing device;
  sending to the web service server a second login including a second user ID and identifying a second user as a new current user of the computing device;
  receiving an encrypted decryption key from the web service server in response to sending the second login including the second user ID;
  decrypting the encrypted decryption key using a shared key known to one of the new current user and the computing device;
  decrypting the new current user's encrypted messages using the decrypted decryption key; and
  displaying the decrypted messages on an electronic display of the computing device.

12. A system, comprising:
  a server comprising a server processor; and
  a computing device configured to communicate with the server,
  wherein the server processor is configured with server-executable instructions to perform operations comprising:
    registering a current user and an offline user of the computing device;
    receiving from the computing device a first user login including a first user ID and identifying a first user as the current user of the computing device;
    querying a database to identify undelivered messages of the current user and to identify undelivered messages of the offline user in response to identifying the first user as the current user of the computing device;
    sending the identified undelivered messages of the current user to the computing device; and
    encrypting the identified undelivered messages of the offline user and sending the encrypted undelivered messages of the offline user to the computing device, and wherein the computing device comprises:
an electronic display;
a memory;
a transceiver configured to communicate with a network coupled to the server; and
a computing device processor coupled to the electronic display, the memory and the transceiver, wherein the computing device processor is configured with processor-executable instructions to perform operations comprising:
sending the first user login to the server;
receiving the undelivered messages of the current user and the undelivered messages of the offline user;
displaying the received messages of the current user on the electronic display via a foreground process; and
storing the received messages of the offline user in the memory via a background process.

13. The system of claim 12, wherein the server processor is configured with server-executable instructions to perform operations such that encrypting the identified undelivered messages of the offline user comprises:
encrypting the identified undelivered messages of the offline user using a random encryption key that is unique to the offline user; and
storing a decryption key suitable for decrypting the identified undelivered messages of the offline user in a data table linked to an identifier of the offline user.

14. The system of claim 13, wherein the server processor is configured with server-executable instructions to perform operations further comprising:
encrypting the identified undelivered messages of the current user prior to transmission; and
transmitting a decryption key for decrypting the identified undelivered messages of the current user to the computing device.

15. The system of claim 13, wherein:
the server processor is configured with server-executable instructions to perform operations further comprising:
receiving from the computing device a second login including a second user ID by a second user and identifying the second user as a new current user of the computing device;
determining whether the new current user had encrypted undelivered messages delivered to the computing device while the new current user was offline;
recalling the stored decryption key linked to the new current user;
encrypting the recalled decryption key using a shared key known to the new current user and the computing device; and
transmitting the encrypted recalled decryption key to the computing device; and
the computing device processor is configured with processor-executable instructions to perform operations further comprising:
sending the second login by the new current user to the server;
receiving the encrypted decryption key;
decrypting the encrypted decryption key using the shared key known to one of the new current user and the computing device;
decrypting the new current user's encrypted messages using the decrypted decryption key; and
displaying the decrypted messages to the new current user on the computing device.

16. The system of claim 12, wherein the server processor is configured with server-executable instructions to perform operations further comprising:
determining a physical layer over which the computing device is accessing the server; and
restricting an amount of data sent to the computing device for the offline user based on the determined type of physical layer.

17. The system of claim 12, wherein:
the server processor is configured with server-executable instructions to perform operations such that sending the encrypted undelivered messages of the offline user to the computing device comprises sending encrypted undelivered messages for multiple offline users to the computing device, and
the server processor is configured with server-executable instructions to perform operations further comprising:
creating a delivery priority for undelivered messages for the multiple offline users; and
sending each of the offline user's encrypted undelivered messages to the computing device based on the delivery priority.

18. The system of claim 17, wherein the server processor is configured with server-executable instructions to perform operations such that creating the delivery priority for undelivered messages for the multiple offline users comprises:
determining a frequency of use by each user of the computing device to access the server; and
prioritizing delivery of undelivered messages for offline users based on the determined frequency of use of the computing device such that undelivered messages for more frequent users are sent before undelivered messages for less frequent users.

19. The system of claim 12, wherein the server processor is configured with server-executable instructions to perform operations further comprising:
recognizing when a particular user is no longer actively using the computing device to access the server; and
not transmitting undelivered messages to the computing device for the particular user recognized as no longer actively using the computing device to access the server.

20. The system of claim 19, wherein the server processor is configured with server-executable instructions to perform operations such that recognizing when the particular user is no longer actively using the computing device to access the server comprises:
determining a frequency of user logins by the particular user received from the computing device; and
recognizing when the particular user is no longer actively using the computing device to access the server based on the determined frequency of user logins by the particular user received from the computing device.

21. A computing device, comprising:
a memory;
a transceiver; and
a processor coupled to the memory and the transceiver, and configured with processor-executable instructions to perform operations comprising:
registering a current user and an offline user who share the computing device with a web service server;
sending to the web service server a first user login including a first user ID and identifying a first user as the current user of the computing device;
receiving undelivered messages of the current user and encrypted undelivered messages of the offline user in response to sending to the web service server the first user login including the first user ID and identifying the first user as the current user of the computing device;

displaying the received messages of the current user on an electronic display via a foreground process; and storing the received messages of the offline user in the memory.

22. The computing device of claim 21, wherein the processor is configured with processor-executable instructions to perform operations further comprising:

sending to the web service server a second login including a second user ID by a second user and identifying the second user as a new current user of the computing device;

receiving an encrypted decryption key;

decrypting the encrypted decryption key using a shared key known to one of the new current user and the computing device;

decrypting the new current user's encrypted messages using the decrypted decryption key; and displaying the decrypted messages to the new current user.

23. A computing device, comprising:

means for registering a current user and an offline user who share the computing device with a web service server;

means for sending to the web service server a first user login including a first user ID and identifying a first user as the current user of the computing device;

means for receiving undelivered messages of the current user and encrypted undelivered messages of an offline user in response to sending to the web service server the first user login including the first user ID and identifying the first user as the current user of the computing device;

means for displaying the received messages of the current user on an electronic display; and means for storing the received messages of the offline user on the computing device.

24. The computing device of claim 23, further comprising:

means for sending to the web service server a second login including a second user ID by a second user and identifying the second user as a new current user of the computing device;

means for receiving an encrypted decryption key;

means for decrypting the encrypted decryption key using a shared key known to one of the new current user and the computing device;

means for decrypting the new current user's encrypted messages using the decrypted decryption key; and means for displaying the decrypted messages to the new current user.

25. A non-transitory processor-readable storage medium having stored thereon processor-executable instructions configured to cause a processor of a computing device to perform operations comprising:

registering a current user and an offline user who share the computing device with a web service server;

sending to the web service server a first user login including a first user ID and identifying a first user as the current user of the computing device;

receiving undelivered messages of the current user and encrypted undelivered messages of an offline user in response to sending to the web service server the first user login including the first user ID and identifying the first user as the current user of the computing device;

displaying the received messages of the current user on an electronic display via a foreground process; and storing the received messages of the offline user in memory.

26. The non-transitory processor-readable storage medium of claim 25, wherein the stored processor-executable instructions are configured to cause the processor of the computing device to perform operations further comprising:

sending to the web service server a second login including a second user ID by a second user and identifying the second user as a new current user of the computing device;

receiving an encrypted decryption key;

decrypting the encrypted decryption key using a shared key known to one of the new current user and the computing device;

decrypting the new current user's encrypted messages using the decrypted decryption key; and displaying the decrypted messages to the new current user.

27. A server, comprising:

a server processor coupled to a memory, wherein the server processor is configured with server-executable instructions to perform operations comprising:

registering a current user and an offline user of a computing device shared by the current user and the offline user;

receiving from the computing device a first user login including a first user ID and identifying a first user as the current user of the computing device;

querying a database to identify undelivered messages of the current user and to identify undelivered messages of the offline user in response to identifying the first user as the current user of the computing device;

sending the identified undelivered messages of the current user to the computing device; and encrypting the identified undelivered messages of the offline user and sending the encrypted undelivered messages of the offline user to the computing device.

28. The server of claim 27, wherein the server processor is configured with server executable instructions to perform operations such that encrypting the identified undelivered messages of the offline user comprises:

encrypting the identified undelivered messages of the offline user using a random encryption key that is unique to the offline user; and storing a decryption key suitable for decrypting the identified undelivered messages of the offline user in a data table linked to an identifier of the offline user.

29. The server of claim 28, wherein the server processor is configured with server executable instructions to perform operations further comprising:

encrypting the identified undelivered messages of the current user prior to transmission; and transmitting a decryption key suitable for decrypting the identified undelivered messages of the current user to the computing device.

30. The server of claim 28, wherein the server processor is configured with server executable instructions to perform operations further comprising:

receiving from the computing device a second login including a second user ID by a second user and identifying the second user as a new current user of the computing device;

determining whether the new current user had encrypted undelivered messages delivered to the computing device while the new current user was offline;

recalling the stored decryption key linked to the new current user;
encrypting the recalled decryption key using a shared key known to the new current user and the computing device; and
transmitting the encrypted recalled decryption key to the computing device.

31. The server of claim 27, wherein the server processor is configured with server executable instructions to perform operations further comprising:
determining a physical layer over which the computing device is accessing the server; and
restricting an amount of data sent to the computing device for the offline user based on the determined type of physical layer.

32. The server of claim 27, wherein:
the server processor is configured with server executable instructions to perform operations such that sending the encrypted undelivered messages of the offline user to the computing device comprises sending encrypted undelivered messages for multiple offline users to the computing device, and
the server processor is configured with server-executable instructions to perform operations further comprising:
creating a delivery priority for undelivered messages for the multiple offline users; and
sending each offline user's encrypted undelivered messages to the computing device based on the delivery priority.

33. The server of claim 32, wherein the server processor is configured with server executable instructions to perform operations such that creating the delivery priority for undelivered messages for the multiple offline users comprises:
determining a frequency of use by each user of the computing device to access the server; and
prioritizing delivery of undelivered messages for offline users based on the determined frequency of use of the computing device such that undelivered messages for more frequent users are sent before undelivered messages for less frequent users.

34. The server of claim 27, wherein the server processor is configured with server executable instructions to perform operations further comprising:
recognizing when a particular user is no longer actively using the computing device to access the server; and
not transmitting undelivered messages to the computing device for the particular user recognized as no longer actively using the computing device to access the server.

35. The server of claim 34, wherein the server processor is configured with server executable instructions to perform operations such that recognizing when the particular user is no longer actively using the computing device to access the server comprises:
determining a frequency of user logins by the particular user received from the computing device; and
recognizing when the particular user is no longer actively using the computing device to access the server based on the determined frequency of user logins by the particular user received from the computing device.

36. A server, comprising:
means for registering a current user and an offline user of a computing device shared by the current user and the offline user;
means for receiving from the computing device a first user login including a first user ID and identifying a first user as the current user of the computing device;
means for querying a database to identify undelivered messages of the current user and to identify undelivered messages of the offline user in response to identifying the first user as the current user of the computing device;
means for sending the identified undelivered messages addressed to the current user to the computing device;
means for encrypting the identified undelivered messages of the offline user; and
means for sending the encrypted undelivered messages of the offline user to the computing device.

37. The server of claim 36, wherein means for encrypting the-identified undelivered messages of the offline user comprises:
means for encrypting the identified undelivered messages of the offline user using a random encryption key that is unique to the offline user; and
means for storing a decryption key suitable for decrypting the identified undelivered messages of the offline user in a data table linked to an identifier of each offline user.

38. The server of claim 37, further comprising:
means for encrypting the identified undelivered messages of the current user prior to transmission; and
means for transmitting a decryption key suitable for decrypting the identified undelivered messages of the current user to the computing device.

39. The server of claim 37, further comprising:
means for receiving from the computing device a second login including a second user ID by a second user and identifying the second user as a new current user of the computing device;
means for determining whether the new current user had encrypted undelivered messages delivered to the computing device while the new current user was offline;
means for recalling the stored decryption key linked to the new current user;
means for encrypting the recalled decryption key using a shared key known to the new current user and the computing device; and
means for transmitting the encrypted recalled decryption key to the computing device.

40. The server of claim 36, further comprising:
means for determining a physical layer over which the computing device is accessing the server; and
means for restricting an amount of data sent to the computing device for the offline user based on the determined type of physical layer.

41. The server of claim 36, wherein:
means for sending the encrypted undelivered messages of the offline user to the computing device comprises sending identified encrypted undelivered messages for multiple offline users to the computing device, the server further comprising:
means for creating a delivery priority for undelivered messages for the multiple offline users; and
means for sending each offline user's encrypted undelivered messages to the computing device based on the delivery priority.

42. The server of claim 41, wherein means for creating the delivery priority for undelivered messages for the multiple offline users comprises:
means for determining a frequency of use by each user of the computing device to access the server; and
means for prioritizing delivery of undelivered messages for offline users based on the determined frequency of use of the computing device such that undelivered messages for more frequent users are sent before undelivered messages for less frequent users.

43. The server of claim 36, further comprising:
  means for recognizing when a particular user is no longer actively using the computing device to access the server; and
  means for not transmitting undelivered messages to the computing device for the particular user recognized as no longer actively using the computing device to access the server.

44. The server of claim 43, wherein means for recognizing when the particular user is no longer actively using the computing device to access the server comprises:
  means for determining a frequency of user logins by the particular user received from the computing device; and
  means for recognizing when the particular user is no longer actively using the computing device to access the server based on the determined frequency of user logins by the particular user received from the computing device.

45. A non-transitory server-readable storage medium having stored thereon server-executable instructions configured to cause a server to perform operations comprising:
  registering a current user and an offline user of a computing device shared by the current user and the offline user;
  receiving from the computing device a first user login including a first user ID and identifying a first user as the current user of the computing device;
  querying a database to identify undelivered messages of the current user and to identify undelivered messages of the offline user in response to identifying the first user as the current user of the computing device;
  sending the identified undelivered messages of the current user to the computing device; and
  encrypting the identified undelivered messages of the offline user and sending the encrypted undelivered messages of the offline user to the computing device.

46. The non-transitory server-readable storage medium of claim 45, wherein the stored server-executable instructions are configured to cause a server to perform operations such that encrypting the identified undelivered messages comprises:
  encrypting the identified undelivered messages of the offline user using a random encryption key that is unique to the offline user; and
  storing for each offline user a decryption key suitable for decrypting the identified undelivered messages of the offline user in a data table linked to an identifier of the offline user.

47. The non-transitory server-readable storage medium of claim 46, wherein the stored server-executable instructions are configured to cause a server to perform operations comprising:
  encrypting the identified undelivered messages of the current user prior to transmission; and
  transmitting a decryption key suitable for decrypting the identified undelivered messages of the current user to the computing device.

48. The non-transitory server-readable storage medium of claim 46, wherein the stored server-executable instructions are configured to cause a server to perform operations comprising:
  receiving from the computing device a second login including a second user ID by a second user and identifying the second user as a new current user of the computing device;
  determining whether the new current user had encrypted undelivered messages delivered to the computing device while the new current user was offline;
  recalling the stored decryption key linked to the new current user;
  encrypting the recalled decryption key using a shared key known to the new current user and the computing device; and
  transmitting the encrypted recalled decryption key to the computing device.

49. The non-transitory server-readable storage medium of claim 45, wherein the stored server-executable instructions are configured to cause a server to perform operations comprising:
  determining a physical layer over which the computing device is accessing the server; and
  restricting an amount of data sent to the computing device for the offline user based on the determined type of physical layer.

50. The non-transitory server-readable storage medium of claim 45, wherein:
  the stored server-executable instructions are configured to cause a server to perform operations such that sending the encrypted undelivered messages of the offline user to the computing device comprises sending identified encrypted undelivered messages for multiple offline users to the computing device; and
  the stored server-executable instructions are configured to cause a server to perform operations further comprising:
    creating a delivery priority for undelivered messages for the multiple offline users; and
    sending each offline user's encrypted undelivered messages to the computing device based on the delivery priority.

51. The non-transitory server-readable storage medium of claim 50, wherein the stored server-executable instructions are configured to cause a server to perform operations such that creating the delivery priority for undelivered messages for the multiple offline users comprises:
  determining a frequency of use by each user of the computing device to access the server; and
  prioritizing delivery of undelivered messages for offline users based on the determined frequency of use of the computing device such that undelivered messages for more frequent users are sent before undelivered messages for less frequent users.

52. The non-transitory server-readable storage medium of claim 45, wherein the stored server-executable instructions are configured to cause a server to perform operations comprising:
  recognizing when a particular user is no longer actively using the computing device to access the server; and
  not transmitting undelivered messages to the computing device for the particular user recognized as no longer actively using the computing device to access the server.

53. The non-transitory server-readable storage medium of claim 52, wherein the stored server-executable instructions are configured to cause a server to perform operations such that recognizing when the particular user is no longer actively using the computing device to access the server comprises:
  determining a frequency of user logins by the particular user received from the computing device; and
  recognizing when the particular user is no longer actively using the computing device to access the server based on the determined frequency of user logins by the particular user received from the computing device.

* * * * *